US011950331B2

(12) United States Patent
Reevell

(10) Patent No.: US 11,950,331 B2
(45) Date of Patent: Apr. 2, 2024

(54) CLEANING TOOL FOR HEATING ELEMENT WITH PRONGS

(71) Applicant: Philip Morris Products S.A., Neuchâtel (CH)

(72) Inventor: Tony Reevell, London (GB)

(73) Assignee: Philip Morris Products S.A., Neuchâtel (CH)

( * ) Notice: Subject to any disclaimer, the term of this patent is extended or adjusted under 35 U.S.C. 154(b) by 879 days.

(21) Appl. No.: 16/977,991

(22) PCT Filed: Mar. 11, 2019

(86) PCT No.: PCT/EP2019/056023
§ 371 (c)(1),
(2) Date: Sep. 3, 2020

(87) PCT Pub. No.: WO2019/175104
PCT Pub. Date: Sep. 19, 2019

(65) Prior Publication Data

US 2021/0037895 A1 Feb. 11, 2021

(30) Foreign Application Priority Data

Mar. 13, 2018 (EP) .................................... 18161501

(51) Int. Cl.
*A24F 40/46* (2020.01)
*A24F 40/85* (2020.01)
(Continued)

(52) U.S. Cl.
CPC ............... *H05B 3/40* (2013.01); *A24F 40/46* (2020.01); *A24F 40/85* (2020.01); *A46B 7/02* (2013.01);
(Continued)

(58) Field of Classification Search
CPC . A24F 3/02; A24F 40/46; A24F 40/85; A46B 15/003; A46B 2200/3013; A46B 7/02; A46D 1/0207; H05B 3/40
See application file for complete search history.

(56) References Cited

U.S. PATENT DOCUMENTS 1,644,574 A * 10/1927 Fitz Gerald ............... A24F 9/06 131/245
4,174,548 A * 11/1979 Dunn ...................... E03F 9/005 4/255.11
(Continued)

FOREIGN PATENT DOCUMENTS

CN 102264251 A 11/2011
CN 104023574 A 9/2014
(Continued)

OTHER PUBLICATIONS

International Search Report and Written Opinion dated Jun. 7, 2019 in PCT/EP2019/056023 filed Mar. 11, 2019.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

There is provided a cleaning tool configured for cleaning an aerosol-generating device including a heating chamber and a heating element disposed in the heating chamber, the cleaning tool including: multiple prongs configured to be inserted into the heating chamber of the aerosol-generating device and to clean at least the heating element; and an actuating element configured to move the multiple prongs between a first position and a second position, wherein the multiple prongs are expanded towards inner sidewalls of the
(Continued)

heating chamber in the first position and contracted towards the heating element in the second position.

13 Claims, 5 Drawing Sheets

(51) Int. Cl.

| | |
|---|---|
| ***A46B 7/02*** | (2006.01) |
| ***A46D 1/00*** | (2006.01) |
| ***H05B 3/40*** | (2006.01) |

(52) U.S. Cl.

CPC .... *A46D 1/0207* (2013.01); *A46B 2200/3013* (2013.01)

(56) References Cited

U.S. PATENT DOCUMENTS

| | | | | | |
|---|---|---|---|---|---|
| 4,698,932 | A * | 10/1987 | Schneider | B08B 9/021 | 15/104.18 |
| 6,418,938 | B1 * | 7/2002 | Fleischhauer | A24F 40/85 | 131/243 |
| 2013/0031735 | A1 * | 2/2013 | Brand | A61B 1/00131 | 15/104.93 |
| 2013/0298905 | A1 * | 11/2013 | Levin | A24F 40/90 | 128/202.21 |
| 2016/0029881 | A1 * | 2/2016 | Guru | A61B 1/3132 | 600/157 |
| 2021/0244105 | A1 * | 8/2021 | Reevell | A24F 40/85 | |
| 2023/0139855 | A1 * | 5/2023 | Priddy | C02F 1/40 | 210/251 |

FOREIGN PATENT DOCUMENTS

| | | | | |
|---|---|---|---|---|
| CN | 204618124 U | | 9/2015 | |
| CN | 205547347 U | | 9/2016 | |
| CN | 106231931 A | | 12/2016 | |
| CN | 106535680 A | | 3/2017 | |
| CN | 106572708 A | | 4/2017 | |
| CN | 107205494 A | | 9/2017 | |
| GB | 735535 | | 8/1955 | |
| GB | 2 329 325 A | | 3/1999 | |
| GB | 2512349 A | | 1/2014 | |
| GB | 2512349 A | | 10/2014 | |
| KR | 10-2011-0096548 A | | 8/2011 | |
| RU | 2 426 481 C2 | | 8/2011 | |
| WO | WO 00/27232 A1 | | 5/2000 | |
| WO | WO 2013/138384 A2 | | 9/2013 | |
| WO | WO 2015/165709 A1 | | 11/2015 | |
| WO | WO-2019175104 A1 | * | 9/2019 | A24F 40/46 |

OTHER PUBLICATIONS

Korean Office Action dated Jan. 12, 2023 in Korean Patent Application No. 10-2020-7024094 (with English language translation), 8 pages.

Combined Chinese Office Action and Search Report dated Dec. 7, 2022 in Chinese Patent Application No. 201980015342.1 (with English Translation), 17 pages.

Brazilian Office Action dated Mar. 31, 2023 in Brazilian Patent Application No. BR112020015025-8 (with unedited computer-generated English translation), 5 pages.

Russian Federation Office Action and Search Report dated Jan. 26, 2021 in Russian Federation Patent Application No. 2020133373/07(060949) (submitting English translation only), 9 pages.

* cited by examiner 3A 3B 3C 3D

CLEANING TOOL FOR HEATING ELEMENT WITH PRONGS

CROSS-REFERENCE TO RELATED APPLICATIONS

This application is a U.S. national stage application of PCT/EP2019/056023, filed on Mar. 11, 2019, which is based upon and claims the benefit of priority under 35 U.S.C. § 119 from European patent application no. 18161501.4, filed Mar. 13, 2018, the entire contents of each of which are incorporated herein by reference.

TECHNICAL FIELD

The present invention relates to a cleaning tool for cleaning an aerosol-generating device.

DESCRIPTION OF THE RELATED ART

For generating an inhalable aerosol, aerosol-generating devices are known which heat but not burn an aerosol-forming substrate. The substrate typically comprises an aerosol-former and homogenised tobacco material. The substrate may be wrapped with a wrapping paper and provided in the form of a disposable rod such as a heat stick. The known aerosol-generating device comprises a heating chamber, in which the aerosol-forming substrate can be inserted. A heating element such as a heating blade is also arranged in the heating chamber of the aerosol-generating device. During operation of the aerosol-generating device, the aerosol-forming substrate is penetrated by the heating element and subsequently heated to generate an inhalable aerosol. After depletion of the aerosol-forming substrate, the substrate is removed from the heating chamber of the aerosol-generating device. A fresh aerosol-forming substrate can then be inserted into the heating chamber. However, residues of the aerosol-forming substrate may remain in the heating chamber and on the heating element.

Thus, there is a need for a device for cleaning the heating chamber and the heating element of the aerosol-generating device after operation and removal of the aerosol-forming substrate.

SUMMARY

According to a first aspect of the invention there is provided a cleaning tool configured for or for cleaning an aerosol-generating device. The aerosol-generating device comprises a heating chamber and a heating element arranged in the heating chamber. The cleaning tool comprises multiple prongs. The prongs are configured to be inserted into the heating chamber of the aerosol-generating device for cleaning at least the heating element.

According to a second aspect of the present invention there is provided an aerosol-generating system comprising an aerosol-generating device according to the first aspect of the present invention in accordance with any of the embodiments described herein. The aerosol-generating system also comprises an aerosol-generating article comprising an aerosol-forming substrate.

BRIEF DESCRIPTION OF THE DRAWINGS

The invention will be further described, by way of example only, with reference to the accompanying drawings in which.

DETAILED DESCRIPTION

Figure 1:
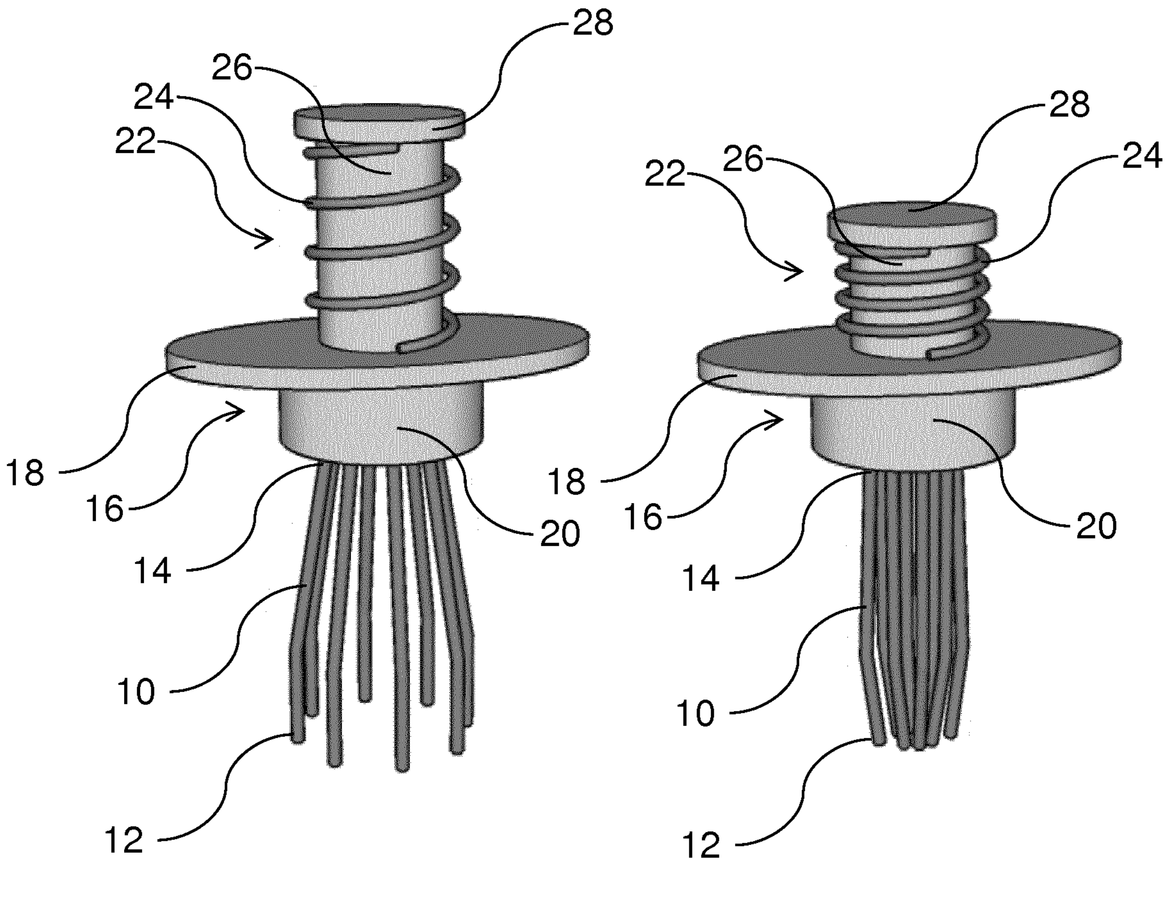
FIG. 1 shows a first embodiment of a cleaning tool with prongs in a first position and in a second position.

By providing a cleaning tool with multiple prongs, a user can easily clean a heating element in a heating chamber of an aerosol-generating device. After using the aerosol-generating device, residues of aerosol-forming substrate may adhere to the heating element which may be unwanted for subsequent use of the aerosol-generating device. By means of the multiple prongs of the cleaning tool, these residues can be removed from the heating element fast and efficiently. Residues may also stick to the walls and the base of the heating chamber. The removal of these residues may also be facilitated by the prongs of the cleaning tool. The prongs may scrape of the residues during insertion or extraction or insertion and extraction of the prongs into/out of the heating chamber.

The prongs may have an elongate shape. The prongs may have a cylindrical shape.

The prongs may have rounded ends. The end of the respective prong which is inserted first into the heating chamber is also referred to as distal end of the prong and the end of the prong which faces the cleaning tool is referred to as proximal end of the prong.

The cleaning tool further comprises an actuating element, which is configured to move the prongs between a first position and a second position. The prongs are expanded towards the inner sidewalls of the heating chamber in the first position and contracted towards the heating element in the second position. The first position is an open position of the prongs, while the second position is a closed position of the prongs. Preferably, the distal ends of the prongs are expanded in the first position and contracted in the second position. The proximal ends of the prongs may be contracted in the first position and expanded in the second position.

The cleaning action may be enhanced by providing the actuation element. The actuation element enables an active movement of the prongs, which is performed via the actuation element. For example, the prongs can be inserted into the heating chamber in an open configuration which corresponds to the first position. Preferably, the distal ends of the prongs are expanded in this position, while the proximal ends of the prongs are contracted towards the longitudinal axis of the cleaning tool. After insertion of the prongs into the heating chamber, the prongs can be moved by the actuation element from the first position into the second position. In the second position, the distal ends of the prongs are moved towards the heating element. In the second position, the distal ends of the prongs may be pushed towards the longitudinal axis of the cleaning tool. The prongs may be aligned along the longitudinal axis of the cleaning tool in the second position of the prongs. The heating element is typically centrally arranged in the heating chamber. The prongs may consequently be moved from the expanded first position into the second position, in which the prongs surround the heating element. Preferably, the prongs contact or grasp the heating element in the second position so that residues are scraped off of the heating element by the prongs. The scraping action is facilitated by pulling the cleaning tool out of the heating chamber and thus sliding the prongs along the length of the heating element. The cleaning may be enhanced by the user or the actuating element moving the prongs up and down the heating element, when the prongs are in the second position. Also, the process may be repeated multiple times.

The multiple prongs may be made of wire. Wire prongs have sufficient rigidity and stability to facilitate the removal of the residues from the heater element. Wire prongs also have a high durability, enhancing the lifespan of the cleaning tool. Preferably, the prongs are made of metal. Alternatively, the prongs can be made from plastic. Preferably, the prongs are arranged in a circular configuration around the longitudinal axis of the cleaning tool. The prongs may be arranged at some distance with respect to the longitudinal axis of the cleaning tool. The prongs may have some degree of flexibility to adapt to different shapes of heating elements.

The prongs may be configured to contact the inner sidewalls of the heating chamber and the base of the heating chamber in the first position, when the cleaning tool is inserted into the heating chamber. The prongs are preferably long enough so that the distal ends of the prongs can reach the base of the heating chamber after insertion of the prongs into the heating chamber. If the prongs are expanded in the first position to contact the inner sidewalls of the heating chamber, residues can be removed from the inner sidewalls of the heating chamber during insertion of the prongs into the heating chamber in the first position.

The prongs may be configured to be rotated in the heating chamber of the aerosol-generating device. The rotative movement may aid in loosening and removing residues from the heating chamber. The prongs may preferably be configured to be rotated in the first position or the second position or in the first and second position. In the first position, a rotation of the prongs may result in an optimized cleaning of the inner sidewalls and the base of the heating chamber. In the second position, a rotation of the prongs may result in an optimized cleaning of the heating element. The rotative movement of the prongs may be facilitated by a user rotating the cleaning tool. Alternatively, the actuating element may be configured to rotate the prongs of the cleaning tool during actuation of the actuating element.

The prongs may be kinked and the distal ends of the prongs may contact the heating element in the second position. Kinked prongs have the advantage that the contact pressure between the distal ends of the prongs and the heating element can be enhanced. In this regard, the prongs are preferably kinked such that only the distal ends of the prongs contact the heating element in the second position of the prongs. Also, the prongs could be shaped such that portions of the kinked prongs adjacent to the distal ends of the prongs lay flush against the inner sidewalls of the heating chamber in the first position of the prongs. This may facilitate insertion of the prongs into the heating chamber. At the same time, scraping off of residues from the inner sidewalls of the heating chamber may be enhanced by portions of the prongs laying flush against the inner sidewalls of the heating chamber.

The prongs may be configured with a roughened surface. The scraping off of residues from the heating element and the heating chamber may be enhanced by the roughened surface of the prongs. Preferably, the portions of the prongs which contact the heating element or the inner sidewalls of the heating chamber or the heating element and the heating chamber are provided with a roughened surface.

The actuating element may comprise a spring, which biases the multiple prongs in the first or second position. The spring may be wound around a shaft of the actuation element and bias the shaft away from the prongs. The shaft may be arranged slidable within the spring so that a user can push the shaft against the biasing force of the spring and in the direction of the proximal ends of the prongs. By pushing the shaft in the direction of the proximal ends of the prongs, the prongs may be moved from the first to the second position or from the second to the first position.

The actuating element may further comprise a handle. The handle may be configured to be gripped by a user. The handle may comprise a plate-shaped element so that the fingers of the user can be placed on the handle on the side of the handle which faces the prongs. Preferably, the thumb of the user can be placed on the shaft of the actuating element so that the shaft can be moved with respect to the plate-shaped handle element in the direction of the proximal ends of the prongs. The shaft may be arranged slidable within a central bore of the handle. The spring of the actuation element may abut the handle.

The actuating element may be configured such that the prongs are moved from the first position to the second position, when the actuating element is actuated. When the actuating element is not actuated, the prongs may be in an expanded state. In the expanded state, the prongs may preferably be inserted into the heating chamber.

The actuating element may comprise a tapered portion, wherein the tapered portion may be configured to contact and push apart the proximal ends of the multiple prongs during actuation of the actuation element. Preferably, the tapered portion is provided at the end of the shaft, which faces the proximal ends of the prongs. The shaft may be configured to be slided from a first position, in which the shaft does not contact the prongs, to a second position, in which the shaft contacts the proximal ends of the prongs. The shaft may be biased towards the first position by the spring.

A user may actuate the shaft of the actuating element and push the shaft in the direction of the proximal ends of the prongs against the biasing force of the spring. After contacting the proximal ends of the prongs, the shaft may be pushed further in the direction of the prongs to push apart the proximal ends of the prongs. The shaft may be arranged along the longitudinal axis of the cleaning tool, while the prongs may be arranged in a circle around the longitudinal axis of the cleaning tool. The proximal ends of the prongs may be arranged around the longitudinal axis of the cleaning tool such that the tapered sides of the tapered portion of the shaft can contact and push apart the proximal ends of the prongs. When the shaft has reached the second position, the proximal ends of the prongs are pushed apart and the prongs are then preferably arranged in the second position.

The prongs may be mounted around the longitudinal axis at mounting positions which are arranged near but spaced apart from the proximal ends of the prongs. In this way, a pushing apart of the proximal ends of the prongs leads to a pivoting movement of the prongs such that the distal ends of the prongs are moved in the direction of the longitudinal axis of the cleaning tool.

The actuating element may alternatively be configured such that the prongs are moved from the second position to the first position, when the actuating element is actuated. In this configuration, the prongs are initially arranged in a closed configuration, when the actuating element is not actuated. This position of the prongs corresponds to the second position of the prongs. The user may actuate the cleaning tool by means of the actuating element before inserting the prongs into the heating chamber according to this aspect of the invention. After insertion of the prongs into the heating chamber, the user may disengage the actuating element and the prongs may return to the second position. The prongs then automatically surround and contact the heating element such that residues will we scraped off of the heating element during extraction of the prongs from the heating chamber of the aerosol-generating device. Alternatively, the prongs may be inserted into the heating chamber without the actuating element being actuated. Then, the prongs will contact the heating element and slide along the heating element during insertion of the prongs into the heating chamber of the aerosol-generating device. Thus, a cleaning action of the heating element may already be facilitated during insertion of the prongs into the heating chamber in this alternative. The user may then actuate the actuation element after insertion of the prongs into the heating chamber. The prongs may be extracted from the heating chamber in the open configuration to scrape off residues of aerosol-forming substrate from the base and inner sidewalls of the heating chamber.

For enabling that the prongs are moved from the second position to the first position upon actuation of the actuating element, the actuating element may also utilize a tapered portion. However, in this embodiment proximal ends of the multiple prongs may be connected with a connection portion. Differing from the embodiment in which the proximal ends of the prongs are pushed apart by the tapered portion, the tapered portion of this embodiment deforms the connection portion. The tapered portion may be configured to contact and elastically deform the connection portion during actuation of the actuation element, thereby pushing together the proximal ends of the multiple prongs. In this way, the proximal ends of the prongs, which are connected with the connection portion, are drawn towards the tapered portion and the longitudinal axis of the cleaning tool. The mounting of the prongs may be identical. Thus, a pivoting movement of the prongs may be the result of the tapered end deforming the connection portion such that the distal ends of the prongs are expanded regarding the longitudinal axis of the cleaning tool.

The invention also relates to an aerosol-generating device and a cleaning tool as described above for cleaning the aerosol-generating device. The aerosol-generating device comprises a heating chamber and a heating element arranged in the heating chamber. The prongs of the cleaning tool are configured to be inserted into the heating chamber of the aerosol-generating device for cleaning at least the heating element.

The aerosol-forming substrate utilized in the aerosol-generating device may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

The heating element may be an electrically resistive heating element. The heating chamber may have a cylindrical shape. The heating element may take the form of a heating blade or an electrically resistive metallic tube. Alternatively, the heating element may be one or more heating needles or rods that run through the center of the aerosol-forming substrate. Optionally, the heating element may be deposited in or on a rigid carrier material. The heating element may be formed as a track on a suitable insulating material, such as ceramic material, and then sandwiched in another insulating material, such as a glass. The heating element advantageously heats the aerosol-forming substrate by means of conduction.

During operation of the aerosol-generating device, the aerosol-forming substrate provided in the form of an article such as a heat stick may be partially contained within the aerosol-generating device. In that case, the user may puff directly on the article. The article may be substantially cylindrical in shape. The article may be substantially elongate. The article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating device may comprise a sensor for activating the heating element. The sensor may preferably be provided as an airflow sensor within the aerosol generating device. The airflow sensor may detect an airflow in an airflow path through the device, when a user draws onto the aerosol-forming substrate. The sensor may also be configured as a negative pressure sensor. The negative pressure sensor may detect that a user draws onto the aerosol-forming substrate, since this may result in a negative pressure in an airflow path through the device. The heating element may also be activated by an on-off button.

The aerosol-generating device may further comprise a power supply for supplying power to the heating element. The power supply may be any suitable power supply, for example a DC voltage source. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The aerosol-generating device may further comprise electric circuitry. The electric circuitry may comprise a microprocessor, which may be a programmable microprocessor. The microprocessor may be part of a controller. The electric circuitry may comprise further electronic components. The electric circuitry may be configured to regulate a supply of power from the power supply to the heating element. Sensor data from the sensor may be sent to the electric circuitry, so that the electric circuitry can control the activation of the heating element and the supply of electrical power to the heating element.

The invention also relates to a method for cleaning an aerosol-generating device with a cleaning tool, wherein the aerosol-generating device comprises a heating chamber and a heating element arranged in the heating chamber, wherein the cleaning tool comprises multiple prongs, wherein the method comprises the step of inserting the prongs into the heating chamber of the aerosol-generating device for cleaning at least the heating element.

The method may comprise the further step of moving the prongs between a first expanded and a second contracted position after insertion of the cleaning tool into the heating chamber.

In this regard, the cleaning tool comprises an actuating element. The actuating element is configured to move the prongs between a first position and a second position. The prongs are expanded towards the inner sidewall of the heating chamber in the first position and contracted towards the heating element in the second position. The prongs are moved between the first and second position of the insertion of the cleaning tool in the heating chamber.

FIG. 1 shows a cleaning tool with prongs 10. The prongs 10 are made of metal wire. The prongs 10 are mounted on the cleaning tool such that the prongs 10 can be moved. In particular, the distal ends 12 of the prongs 10 can be moved from an expanded position towards a contracted position. The distal ends 12 of the prongs 10 are positioned such that the distal ends 12 of the prongs 10 are inserted into a heating chamber of an aerosol-generating device first. Opposite of the distal ends 12 of the prongs 10, proximal ends 14 of the prongs 10 are provided.

The proximal ends 14 of the prongs 10 are connected to a handle 16. The handle 16 comprises a plate-shaped element 18. The plate-shaped element 18 is large enough such that a user can grip the plate-shaped element 18, preferably by sliding two fingers under the plate-shaped element 18. The handle 16 further comprises a tubular element 20. The proximal ends 14 of the prongs 10 are at least partly arranged inside of the tubular element 20.

Opposite of the proximal ends 14 of the prongs 10, an actuating element 22 is provided. The actuating element 22 comprises a spring 24 and a shaft 26. The shaft 26 is at least partly arranged inside of the tubular element 20 of the handle 16. The shaft 26 is configured slidable inside of the tubular element 20. The spring 24 is arranged winding around the shaft 26. The spring 24 abuts the plate-shaped element 18 of the handle 16 and a protruding rim 28 of the actuating element 22. In this way, the shaft 26 is biased in a first position, in which the shaft 26 is pushed away from the handle 16 and the prongs 10. The first position is depicted in the left part of FIG. 1. For actuating the actuating element 22, a user can push the shaft in the direction of the handle 16 and the prongs 10 while fixating the handle 16. Preferably, the user can slide two fingers under the plate-shaped element 18 of the handle 16 and place a thumb on top of the protruding rim 28 of the actuating element 22. Then, the user can push the thumb in the direction of the handle 16, which is fixated by the two fingers under the plate-shaped element 18 of the handle 16 such that the shaft 26 is positioned in a second position. Hence, the prongs 10 are closed, when a user pushes the shaft 26 in the direction of the prongs 10. The second position is depicted in the right part of FIG. 1. Upon releasing the handle 16, the shaft 26 is urged back into the first position by means of the spring 24.

Figure 2:
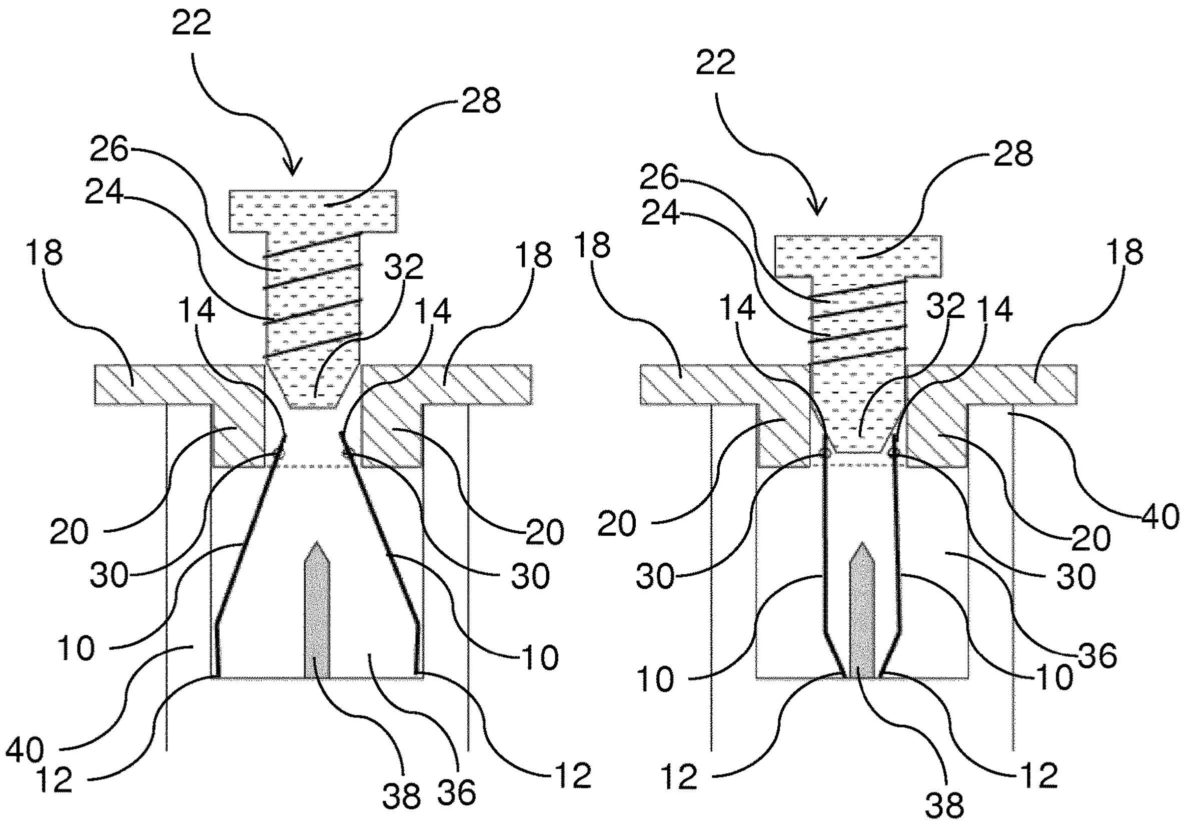
FIG. 2 shows a cross-sectional view of the cleaning tool of FIG. 1.

FIG. 2 shows a cross-sectional view of the cleaning tool. The actuation action of the actuating element 22 can be seen in FIG. 2. As described with respect to FIG. 1, the actuating element 22 can be actuated such that the shaft 26 is moved from a first position into a second position. The left part of FIG. 2 shows the first position, while the right part of FIG. 2 shows the second position.

As depicted in FIG. 2, the prongs 10 are mounted in the cleaning tool at mounting positions 30. This arrangement allows the prongs 10 to pivot around the mounting positions 30. The prongs 10 are furthermore partly arranged inside of the tubular element 20. The shaft 26 is arranged slidably and at least partly inside of the tubular element 20. When the shaft 26 is in the first position, as depicted in the left part of FIG. 2, the shaft does not contact the proximal ends 14 of the prongs 10. The shaft 26 comprises a tapered portion 32. The tapered portion 32 of the shaft 26 is arranged opposite to the protruding rim 28 and is facing the proximal ends 14 of the prongs 10. When the actuating element 22 is actuated, the shaft 26 is pushed into the tubular element 20 in the direction of the proximal ends 14 of the prongs 14. The spring 24 allows a movement of the shaft 26 so that the tapered portion 32 of the shaft 26 contacts the proximal ends 14 of the prongs 10 and pushes the proximal ends 14 apart. The shaft 26 is then in the second position. As a consequence of the proximal ends 14 being pushed apart, the prongs 10 pivot around the mounting positions 30, leading to a contracting movement of the distal ends 12 of the prongs 10. In other words, the proximal ends 14 of the prongs 10 are moved away from the longitudinal axis of the cleaning tool, when the shaft 26 is in the second position, and, at the same time, the distal ends 12 of the prongs are moved towards the longitudinal axis of the cleaning tool, when the shaft 26 is in the second position.

Figure 3:
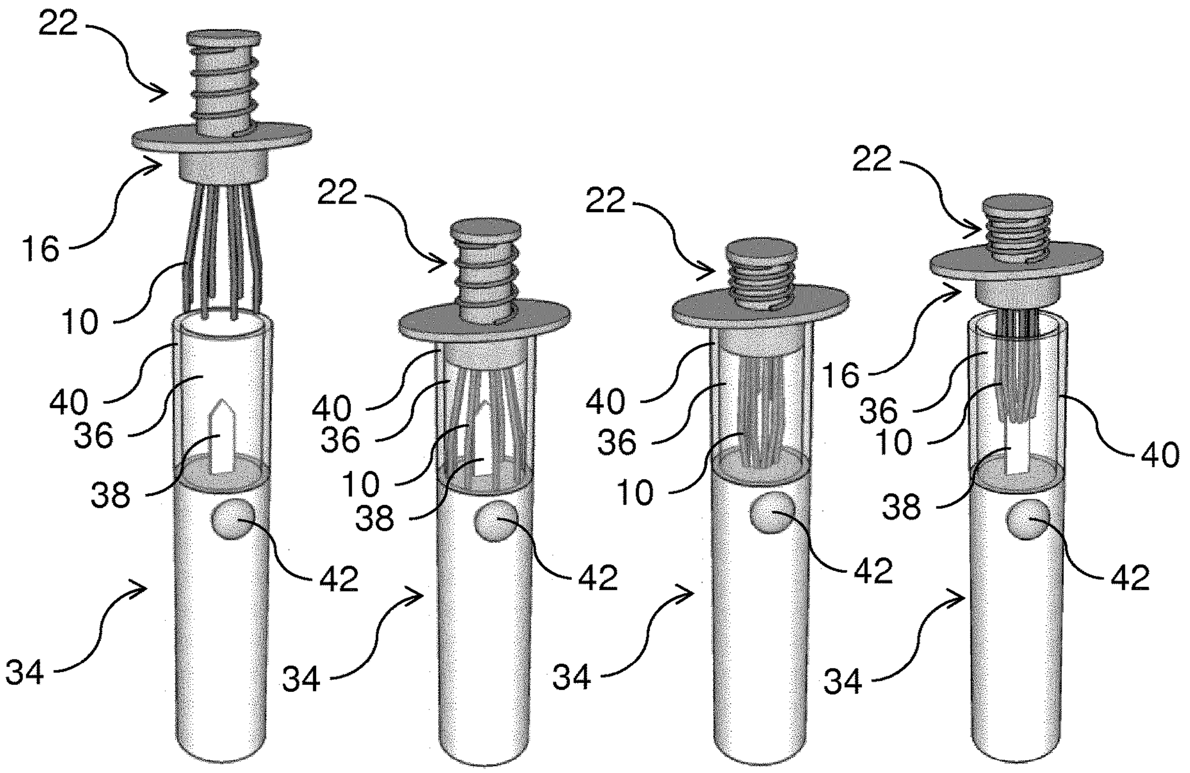
FIG. 3 shows the cleaning tool of FIG. 1 and an aerosol-generating device, wherein the cleaning tool is inserted into the aerosol-generating device.

FIG. 3 shows the usage of the cleaning tool for cleaning an aerosol-generating device 34. From left to right, FIGS. 3A to 3D show how to insert the cleaning tool into a heating chamber 36 of the aerosol-generating device 34 and subsequently how to clean a heating element 38, which is arranged in the heating chamber 36, and the heating chamber 36 itself. The heating chamber 36 has a cylindrical shape and is surrounded by a housing 40 of the aerosol generating device 34. A rod comprising aerosol-forming substrate can be inserted into the heating chamber 36. During operation of the aerosol-generating device 34, the blade-shaped heating element 38 penetrates the aerosol-forming substrate for aerosol generation. The blade-shaped heating element 38 is centrally aligned within the heating chamber 36 along the longitudinal axis of the heating chamber 36.

The aerosol-generating device 34 comprises on-off button 42 for activating the heating element 38. Alternatively, the heating element 38 may be activated by means of a sensor such as an airflow sensor or a negative pressure sensor. Within the aerosol-generating device 34, a power supply, preferably in the form of a battery, and a control unit is arranged. The control unit controls a supply of electrical power from the power supply to the heating element 38 during activation of the heating element 38.

When the aerosol-forming substrate, which is penetrated by the heating element 38, is depleted after multiple operations of the heating element 38, the rod comprising the aerosol-forming substrate is removed from the heating chamber 36. Residues off the aerosol-forming substrate may stick to the heating element 38. Such residues may also stick to the inner sidewalls of the heating chamber 36 or the base of the heating chamber 36. The cleaning tool according to the present invention is utilized to remove these residues.

As can be seen in FIG. 3A, the prongs 10 of the cleaning tool are in an expanded position before insertion of the cleaning tool into the heating chamber 36 of the aerosol-generating device 34. As described with reference to FIG. 2, this positioning of the prongs 10 corresponds to the first position of the shaft 26. This positioning of the prongs 10 will also be referred to in the following as the first position of the prongs 10. In FIG. 3B, the prongs 10 of the cleaning tool have been fully inserted into the heating chamber 36 of the aerosol-generating device 34. The distal ends 12 of the prongs 10 contact the base of the heating chamber 36 as well as the inner sidewalls of the heating chamber 36. During insertion of the prongs 10 into the heating chamber 36 of the aerosol-generating device 34, residues sticking to the inner sidewalls of the heating chamber 36 may be scraped off by the expanded prongs 10.

FIG. 3C shows the shaft 26 in the second position, which leads to the prongs 10 being contracted towards the longitudinal axis of the cleaning tool. This position is also referred to as the second position of the prongs 10. In this position, the distal ends 12 of the prongs 10 contact the heating element 38. This operation of the cleaning tool is facilitated by actuating the actuating element 22. During this operation, residues may be scraped off the base of the heating chamber 36 by the distal ends 12 of the prongs 10. The actuating element 22 is actuated by a user sliding two fingers under the handle 16, while pushing the protruding rim 28 in the direction of the handle 16.

FIG. 3D shows how the cleaning tool is removed from the heating chamber 36, thereby cleaning the heating element 38. While the cleaning tool is removed from the heating chamber 36, the user continues to actuate the actuating element 22 such that the prongs 10 stay in the second position. Consequently, the distal ends 12 of the prongs 10 stay in contact with the heating element 38 during removal of the cleaning tool out of the heating chamber 36. In this way, residues are scraped off of the heating element 38.

Figure 4:
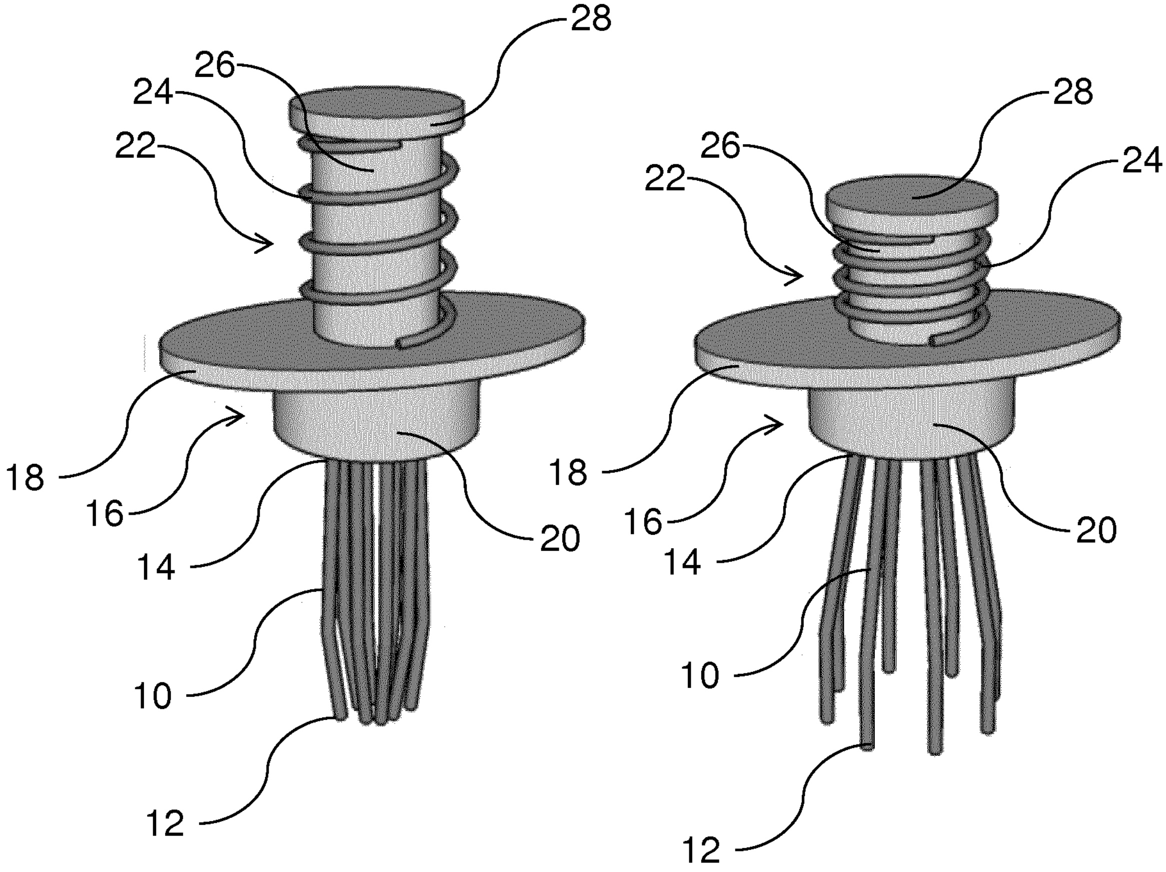
FIG. 4 shows a second embodiment of the cleaning tool, in which the prongs of the cleaning tool are positioned in the second position, if the cleaning tool is not actuated.

FIG. 4 shows a second embodiment of the present invention, in which the first and second positions of the prongs 10 are reversed with respect to the shaft 26. In this embodiment, the prongs 10 are in a contracted position, when the shaft 26 is in the first position. This arrangement is depicted in the left part of FIG. 4. In the right part of FIG. 4, the shaft 26 is in the second position, which leads to the prongs 10 being placed in an expanded position. In other words, the prongs 10 are in a contracted position, when the actuating element 22 is not actuated. The prongs 10 are in an expanded position, when the actuating element 22 is actuated.

Figure 5:
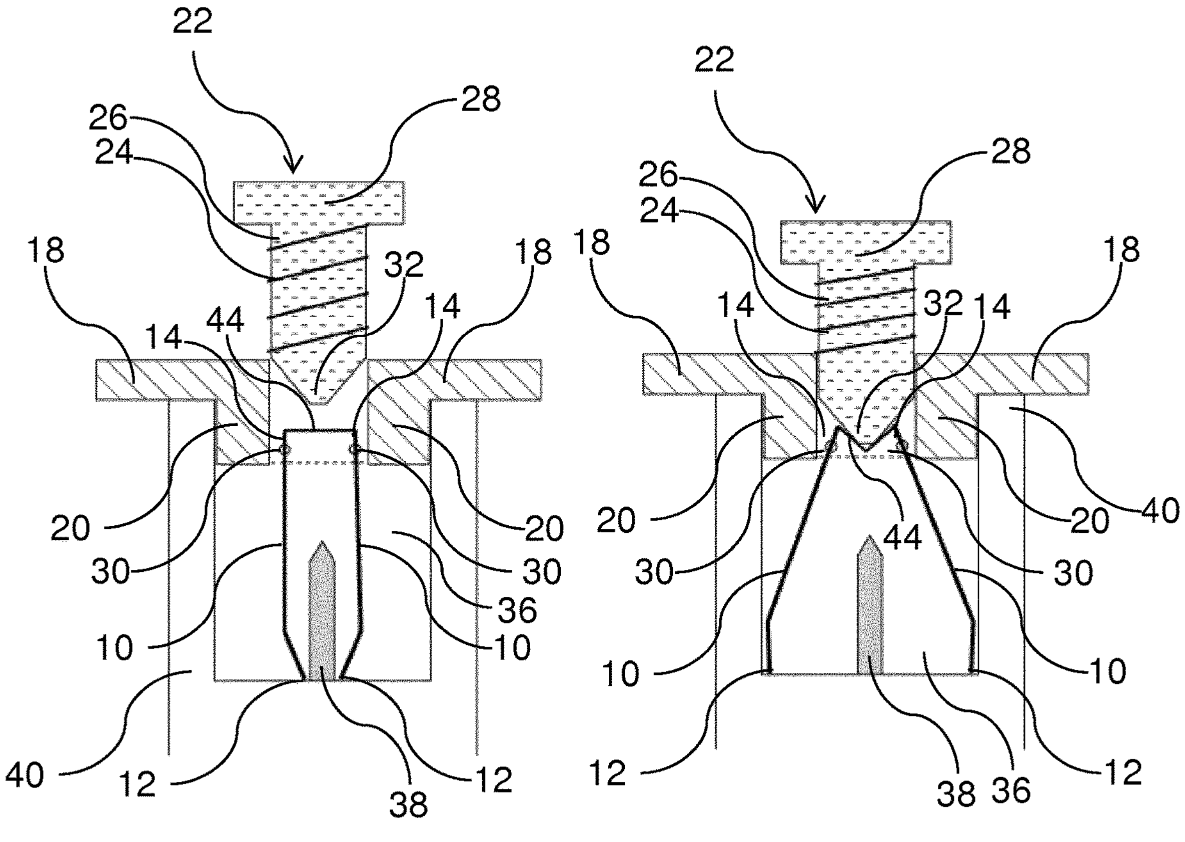
FIG. 5 shows a cross-sectional view of the cleaning tool according to the second embodiment.

FIG. 5 shows the arrangement of the cleaning tool according to the second embodiment. Essentially, the components of the cleaning tool according to the second embodiment correspond to the components of the cleaning tool according to the first embodiment. The differences between the second and the first embodiment can be seen next to the mounting positions 30 of the prongs 10. While in the first embodiment, the prongs 10 are not connected with each other, the prongs 10 according to the second embodiment are connected with each other by means of a connection portion 44. The connection portion 44 connects the proximal ends 14 of the prongs 10 with each other. Furthermore, the connection portion 44 is configured elastic and to be contacted by the tapered portion 32 of the shaft 26.

Compared to the first embodiment, the tapered portion 32 of the shaft 26 is not configured to directly contact the proximal ends 14 of the prongs 10, when the actuating element 22 is actuated. In the second embodiment, the tapered portion 32 of the shaft 22 contacts the connection portion 44, when the actuating element 22 is actuated. Due to the elastic configuration of the connection portion 44, the tapered portion 32 deforms the connection portion 44, when the actuating element 22 is actuated. As a consequence, the proximal ends 14 of the prongs 10 are pulled towards the longitudinal axis of the cleaning tool, when the tapered portion 32 of the shaft 26 deforms the connection portion 44. When the proximal ends 14 of the prongs 10 are pulled towards the longitudinal axis of the cleaning tool, the prongs 10 pivot around the mounting positions 30, so that the distal ends 12 of the prongs 10 are pushed away from the longitudinal axis of the cleaning tool. As a consequence, the distal ends 12 of the prongs 10 are moved from the contracted position towards the expanded position during actuation of the actuating element 22.

In the second embodiment of the present invention, the cleaning tool is actuated by a user before insertion of the prongs 10 of the cleaning tool into the heating chamber 36 of the aerosol-generating device 34. When the prongs 10 are in an expanded position after actuation of the actuating element 22, the prongs 10 are inserted into the heating chamber 36 as described with reference to FIG. 3. After insertion of the cleaning tool, the actuation element 22 is released and the prongs 10 close and contact the heating element 38. The cleaning tool can then be withdrawn from the heating chamber 36, thereby cleaning the heating element 38.

As an alternative, the cleaning tool according to the second embodiment can be inserted into the heating chamber 36, when the prongs 10 are in a contracted position. Then, the prongs 10 are pushed over the heating element 38 during insertion of the prongs 10 into the heating chamber 36. Thus, residues of aerosol-forming substrate can be scraped of the heating element 38 during insertion of the prongs 10 into the heating chamber 36 instead of scraping off of the residues during extraction of the prongs 10. When the cleaning tool is operated in this way, the prongs 10 can be expanded after being pushed over the heating element 38. Then, residues of the aerosol-forming substrate can be scraped of the base and the inner sidewalls of the heating chamber 36 during removal of the prongs 10 of the cleaning tool from the heating chamber 36 of the aerosol-generating device 34.

The present invention is not limited by the described embodiments. The skilled person understands that the described features can be combined with each other within the scope of the invention.

The invention claimed is:

1. A cleaning tool configured for cleaning an aerosol-generating device comprising a heating chamber and a heating element disposed in the heating chamber, the cleaning tool comprising:
- multiple prongs configured to be inserted into the heating chamber of the aerosol-generating device and to clean at least the heating element; and
- an actuating element configured to move the multiple prongs between a first position and a second position,
- wherein the multiple prongs are expanded towards inner sidewalls of the heating chamber in the first position and contracted towards the heating element in the second position.

2. The cleaning tool according to claim 1, wherein the multiple prongs are made of wire.

3. The cleaning tool according to claim 1, wherein the multiple prongs are further configured to contact the inner sidewalls of the heating chamber and a base of the heating chamber in the first position, when the cleaning tool is inserted into the heating chamber.

4. The cleaning tool according to claim 1, wherein the multiple prongs are further configured to surround and to contact the heating element in the second position, when the cleaning tool is inserted into the heating chamber.

5. The cleaning tool according to claim 4, wherein the multiple prongs are kinked and ends of the multiple prongs contact the heating element in the second position.

6. The cleaning tool according to claim 1, wherein the multiple prongs are further configured with a roughened surface.

7. The cleaning tool according to claim 1, wherein the actuating element comprises a spring, which biases the multiple prongs in the first position or the second position.

8. The cleaning tool according to claim 1, wherein the actuating element is further configured such that the multiple prongs are moved from the first position to the second position, when the actuating element is actuated.

9. The cleaning tool according to claim 8, wherein the actuating element comprises a tapered portion, and wherein the tapered portion is configured to contact and to push apart proximal ends of the multiple prongs during actuation of the actuating element.

10. The cleaning tool according to claim 1, wherein the actuating element is configured such that the prongs are moved from the second position to the first position, when the actuating element is actuated.

11. The cleaning tool according to claim 10, wherein the actuating element comprises a tapered portion, wherein proximal ends of the multiple prongs are connected with a connection portion, and wherein the tapered portion is configured to contact and to elastically deform the connection portion during actuation of the actuating element, thereby moving the multiple prongs from the second position to the first position.

12. A system comprising an aerosol-generating device and a cleaning tool according to claim 1, the aerosol-generating device comprising a heating chamber and a heating element disposed in the heating chamber, wherein multiple prongs of the cleaning tool are configured to be inserted into the heating chamber of the aerosol-generating device and to clean at least the heating element.

13. A method for cleaning an aerosol-generating device with a cleaning tool, the aerosol-generating device comprising a heating chamber and a heating element disposed in the heating chamber, and the cleaning tool comprising multiple prongs, the method comprising:

inserting the multiple prongs into the heating chamber of the aerosol-generating device for cleaning at least the heating element, wherein the cleaning tool further comprises an actuating element configured to move the multiple prongs between a first position and a second position, and wherein the multiple prongs are expanded towards inner sidewalls of the heating chamber in the first position and contracted towards the heating element in the second position; and moving the multiple prongs between the first position and the second position after insertion of the cleaning tool into the heating chamber.

* * * * *